Alfred R. Clark.
Plant, Pole, and Post Hole, Auger.
No. 118196
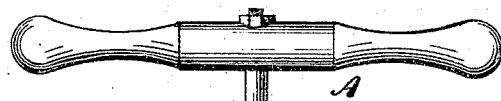
Patented Aug 22 1871
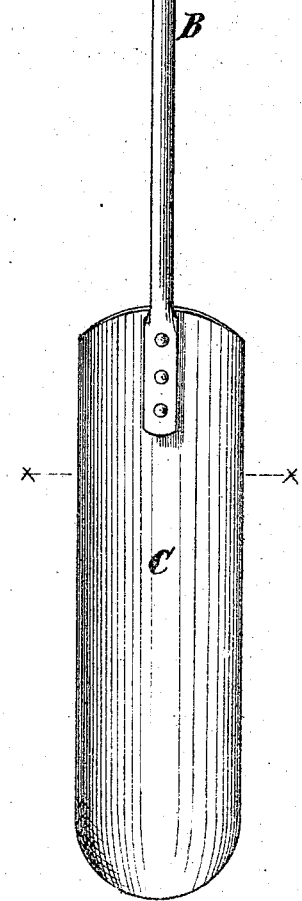
Witnesses
E. Morse
W. G. Clark
Inventor
Alfred R. Clark

UNITED STATES PATENT OFFICE.

ALFRED R. CLARK, OF ALBIA, IOWA.

IMPROVEMENT IN POST-HOLE AUGERS.

Specification forming part of Letters Patent No. 118,196, dated August 22, 1871.

*To all whom it may concern:*

Be it known that I, ALFRED R. CLARK, of the town of Albia, in the county of Monroe and State of Iowa, have invented a new and useful implement for setting hedge and other plants, and for use as a pole and post-hole auger; and I do hereby declare that the following is a full, clear, and exact description of the construction and operation of the same, reference being had to the annexed drawing making a part of this specification, in which—

Figure 1 is a front view of said implement, A representing the handle, B the shaft, and C the blade of the same. Fig. 2 represents a side view of the blade of said invention, B representing the lower portions of the shaft, and C the blade, same as in Fig. 1; and Fig. 3 represents a transverse section of said blade.

The handle A of Fig. 1 may be made of any suitable material, as wood or metal; the shaft B of Fig. 1 of iron or steel; the blade C of Fig. 1 of steel. This implement may be made of any convenient size, the handle being made of sufficient size to work the same. The shaft is to be securely fastened to the handle, and also to the blade, said shaft being made of suitable length for the purpose. The blade C is made concavo-convex, and curving gradually near its point toward the front, the concave side thereof being the front.

This implement is operated by the operator pressing down and turning the implement while it is in the ground, and then lifting the earth out by raising said implement.

The invention consists in the concave blade, above described, for the purpose of boring a hole in the earth for any purpose whatever, and removing the earth from the same.

I claim—

As a new article of manufacture, the semi-cylindrical blade C contracted at its lower end into a pod-shape, having the shank B and handle A attached, as described.

ALFRED R. CLARK.

Witnesses:
   E. MORSE,
   W. G. CLARK.